United States Patent
Chae

(10) Patent No.: US 9,872,266 B2
(45) Date of Patent: Jan. 16, 2018

(54) METHOD AND APPARATUS FOR DEVICE-TO-DEVICE TERMINAL FOR ACQUIRING SYNCHRONIZATION IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/111,766

(22) PCT Filed: Jan. 28, 2015

(86) PCT No.: PCT/KR2015/000908
§ 371 (c)(1),
(2) Date: Jul. 14, 2016

(87) PCT Pub. No.: WO2015/115795
PCT Pub. Date: Aug. 6, 2015

(65) Prior Publication Data
US 2016/0337995 A1    Nov. 17, 2016

Related U.S. Application Data

(60) Provisional application No. 61/932,742, filed on Jan. 28, 2014.

(51) Int. Cl.
*H04W 56/00*     (2009.01)
*H04L 12/733*    (2013.01)
*H04W 76/02*     (2009.01)

(52) U.S. Cl.
CPC ........ *H04W 56/002* (2013.01); *H04L 45/122* (2013.01); *H04W 56/001* (2013.01); *H04W 76/023* (2013.01)

(58) Field of Classification Search
None
See application file for complete search history.

(56) References Cited

U.S. PATENT DOCUMENTS

2008/0165761 A1* 7/2008 Goppner ............... H04B 7/269
                                                 370/350
2009/0196277 A1* 8/2009 Horn .................... H04J 3/0679
                                                 370/350
(Continued)

FOREIGN PATENT DOCUMENTS

EP    1976165        10/2008
WO    2011-065752    6/2011

OTHER PUBLICATIONS

PCT International Application No. PCT/KR2015/000908, Written Opinion of the International Searching Authority dated Apr. 29, 2015, 19 pages.

*Primary Examiner* — Anh Ngoc Nguyen
(74) *Attorney, Agent, or Firm* — Lee, Hong, Degerman, Kang & Waimey PC

(57) ABSTRACT

An embodiment according to the present invention, with respect to a method for a terminal for acquiring device-to-device synchronization, comprises the steps of: receiving from two or more nodes, synchronization signals comprising hop count values; and selecting from among the synchronization signals a synchronization signal to be used for acquiring synchronization, wherein if the hop count values of the synchronization signals received from two or more nodes are different, then the synchronization signal with the lowest hop count value is selected as the synchronization signal to be used in acquiring synchronization, and if the hop count values are the same, then the synchronization signal to be used for acquiring synchronization is selected by utilizing information regarding the signal qualities of the current hop and the previous hop.

13 Claims, 6 Drawing Sheets

(56) References Cited

U.S. PATENT DOCUMENTS

| | | | |
|---|---|---|---|
| 2013/0077512 A1* | 3/2013 | Chang | H04W 56/001 370/252 |
| 2013/0301633 A1 | 11/2013 | Brown et al. | |
| 2013/0336307 A1 | 12/2013 | Park et al. | |
| 2015/0117437 A1* | 4/2015 | Abedini | H04W 56/0025 370/350 |

* cited by examiner

METHOD AND APPARATUS FOR DEVICE-TO-DEVICE TERMINAL FOR ACQUIRING SYNCHRONIZATION IN WIRELESS COMMUNICATION SYSTEM

CROSS-REFERENCE TO RELATED APPLICATIONS

This application is the National Stage filing under 35 U.S.C. 371 of International Application No. PCT/KR2015/000908, filed on Jan. 28, 2015, which claims the benefit of U.S. Provisional Application No. 61/932,742, filed on Jan. 28, 2014, the contents of which are all hereby incorporated by reference herein in their entirety.

TECHNICAL FIELD

The present invention relates to a wireless communication system, and more particularly, to a method and apparatus for acquiring synchronization in device-to-device communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to provide a method of obtaining synchronization by selecting a specific synchronization signal from a plurality of relayed synchronization signals.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of obtaining D2D (device-to-device) synchronization by a user equipment in a wireless communication system, including: receiving synchronization signals containing hop count values from two or more nodes; and selecting a synchronization signal to be used to obtain synchronization from the synchronization signals. If the hop count values of the synchronization signals received from the two or mode nodes are different from each other, a synchronization signal with a lowest hop count value may be selected as the synchronization signal to be used to obtain the synchronization. In addition, if the hop count values are identical to each other, the synchronization signal to be used to obtain the synchronization may be selected by using information on a signal quality of a current hop and information on a signal quality of a previous hop before the current hop.

In a second technical aspect of the present invention, provided herein is a D2D (device-to-device) user equipment for obtaining D2D synchronization in a wireless communication system, including: a receiving module; and a processor. The processor may be configured to receive synchronization signals containing hop count values from two or more nodes and select a synchronization signal to be used to obtain synchronization from the synchronization signals. If the hop count values of the synchronization signals received from the two or mode nodes are different from each other, a synchronization signal with a lowest hop count value may be selected as the synchronization signal to be used to obtain the synchronization. In addition, if the hop count values are identical to each other, the synchronization signal to be used to obtain the synchronization may be selected by using information on a signal quality of a current hop and information on a signal quality of a previous hop before the current hop.

All or some of the following items may be included in the first and second technical aspects of the present invention.

If the signal quality of the current hop is equal to or lower than a first reference value with reference to a node determining the hop count value, the hop count value may be increased by greater than a value increased when the signal quality of the current hop is higher than a preset value with reference to the node determining the hop count value.

If the signal quality of the current hop is equal to or lower than a second reference value with reference to the node determining the hop count value, the node determining the hop count value may stop transmission of the synchronization signal.

The synchronization signal may include information on a signal reception quality of a hop before one hop from the current hop.

The user equipment may use a synchronization signal randomly selected from synchronization signals satisfying a condition that the signal quality of the current hop is equal to or higher than a first reference value and the signal quality of the hop before one hop from the current hop is equal to or higher than a second reference value to obtain the synchronization.

The user equipment may use a synchronization signal satisfying a condition that a sum of the signal quality of the current hop and the signal quality of the hop before one hop from the current hop is equal to or higher than a third reference value to obtain the synchronization.

The synchronization signal may include information on a reception quality accumulated to a hop before the current hop.

The user equipment may use a synchronization signal randomly selected from synchronization signals satisfying a condition that the signal quality of the current hop is equal to or higher than a first reference value and the accumulated reception quality is equal to or higher than a second reference value to obtain the synchronization.

The user equipment may use a synchronization signal satisfying a condition that a sum of the signal quality of the current hop and the accumulated reception quality is equal to or higher than a third reference value to obtain the synchronization.

The synchronization signal may include information on a signal quality of each of all the hops before the current hop.

The user equipment may use a synchronization signal randomly selected from synchronization signals satisfying a condition that the signal quality of the current hop is equal to or higher than a first reference value and the signal quality of each of all the hops before the current hop is equal to or higher than a second reference value to obtain the synchronization.

The hop count value and the information on the signal quality of the previous hop may be transmitted through a PD2DSS (physical D2D synchronization channel).

Advantageous Effects

According to the present invention, a synchronization can be obtained in a manner of selecting an optimized synchronization signals from a plurality of relayed synchronization signals.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
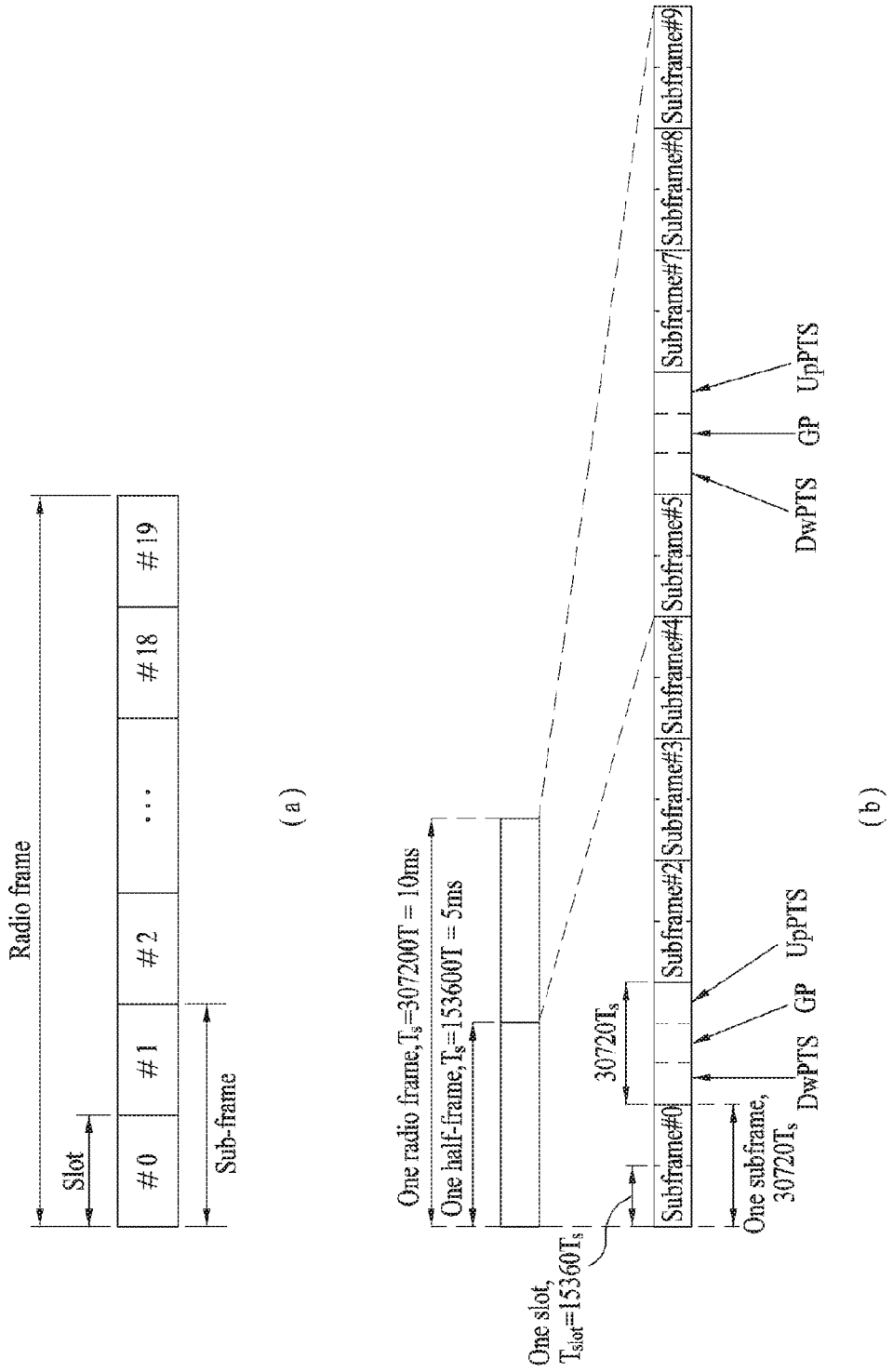
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
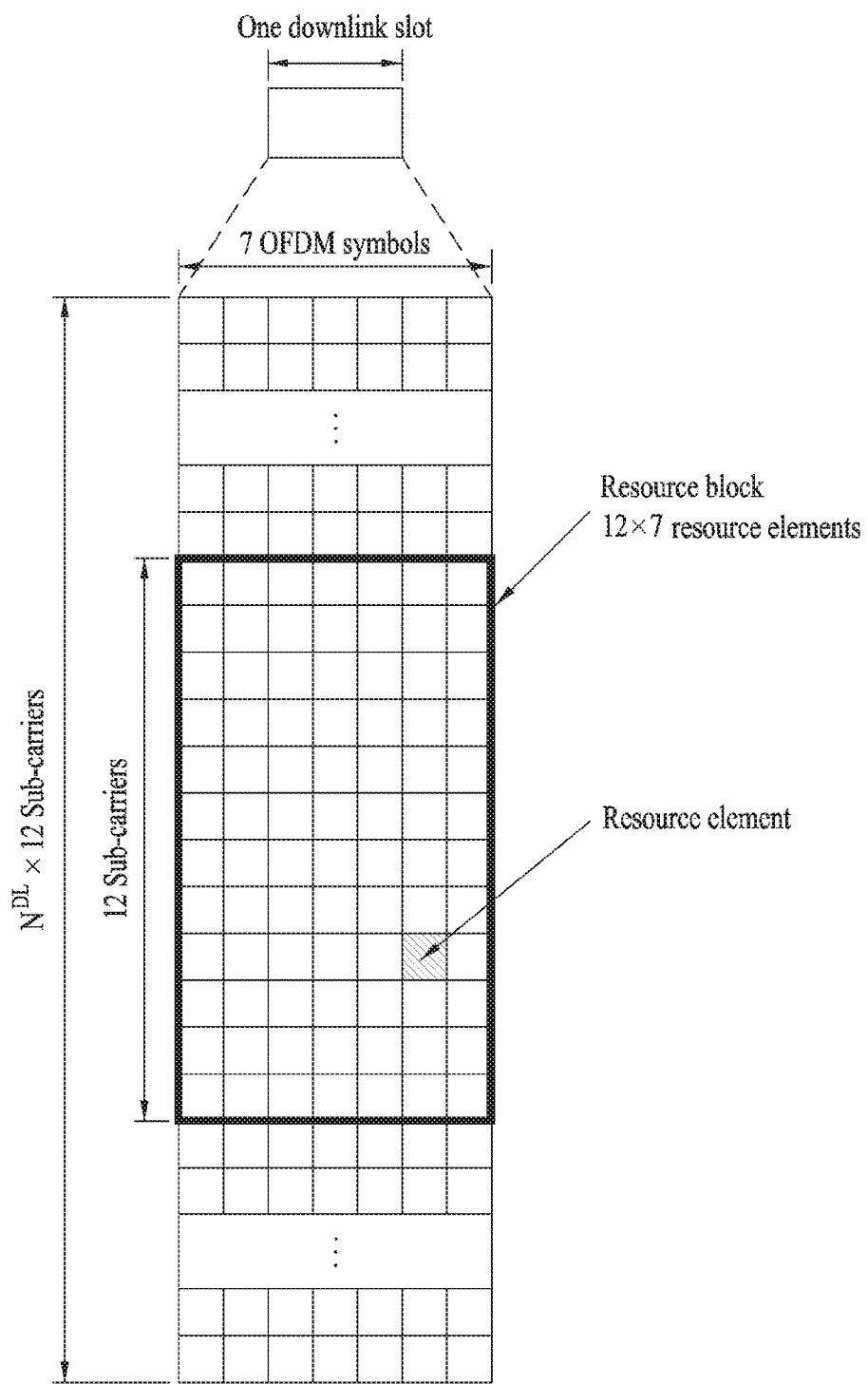
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
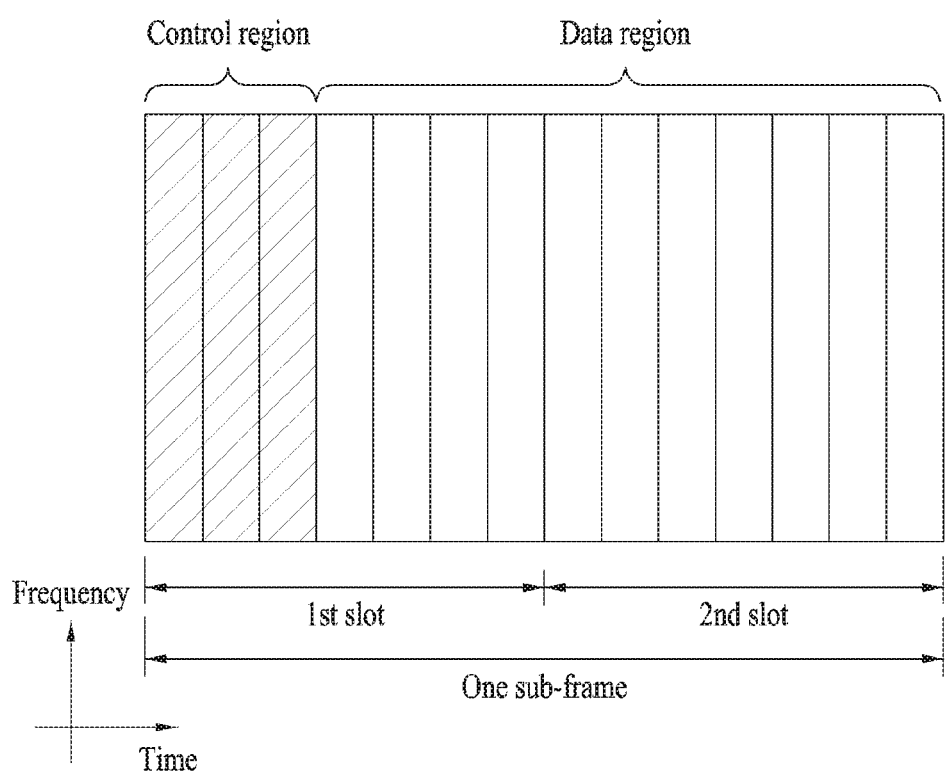
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
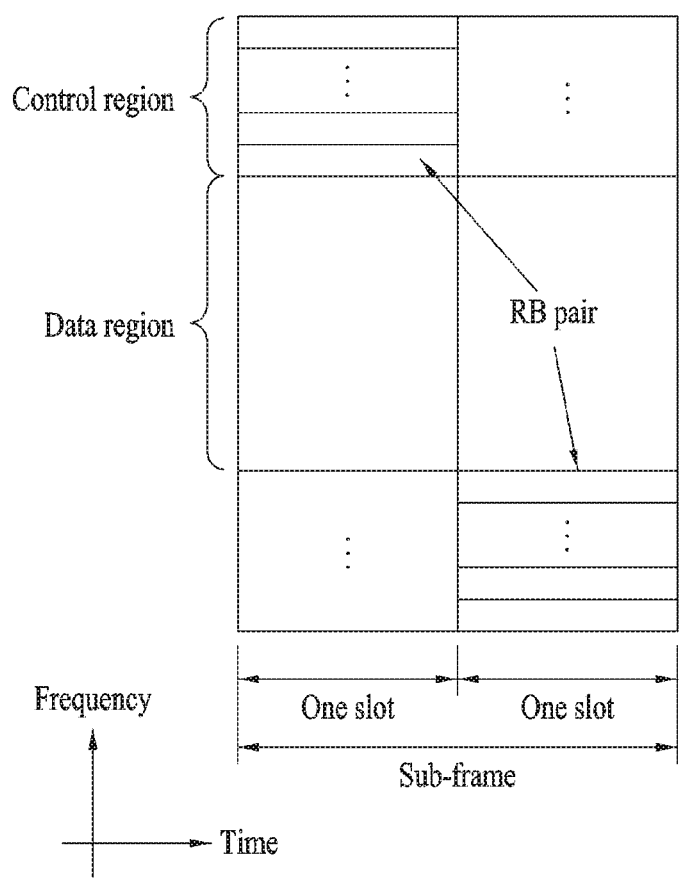
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition at D2D UE

Hereinafter, description will be given of acquisition of synchronization between UEs in D2D communication based on the above description and the legacy LTE/LTE-A system. In the OFDM system, if time/frequency synchronization is not matched, OFDM signals may not be multiplexed between different UEs due to inter-cell interference. Moreover, it is not efficient that all D2D UEs individually match synchronization by directly transmitting and receiving synchronization signals. Accordingly, in a distributed node system such as the D2D system, a specific node may transmit a representative synchronization signal and other UEs may match synchronization with reference to the representative synchronization signal. In the present invention, it is assumed that some nodes (here, the node may correspond to an eNB, UE, or SRN (synchronization reference node)) transmit synchronization signals (e.g., D2DSS (Here, D2DSS may mean a signal that enables a D2D UE to match synchronization. When an eNB transmits D2DSS, the D2DSS may be PSS/SSS. And, when a specific UE transmits D2DSS, the D2DSS may be different from the PSS/SSS.)) for D2D signal transmission and reception and other UEs transceive signals by matching synchronization with reference to the synchronization signals. A physical D2D synchronization channel (PD2DSCH) may mean a (broadcast) channel for carrying basic (system) information (e.g., D2DSS related information, duplex mode, TDD configuration, information on a resource pool, etc.) which a UE needs to know before transmitting and receiving a D2D signal.

Figure 5:
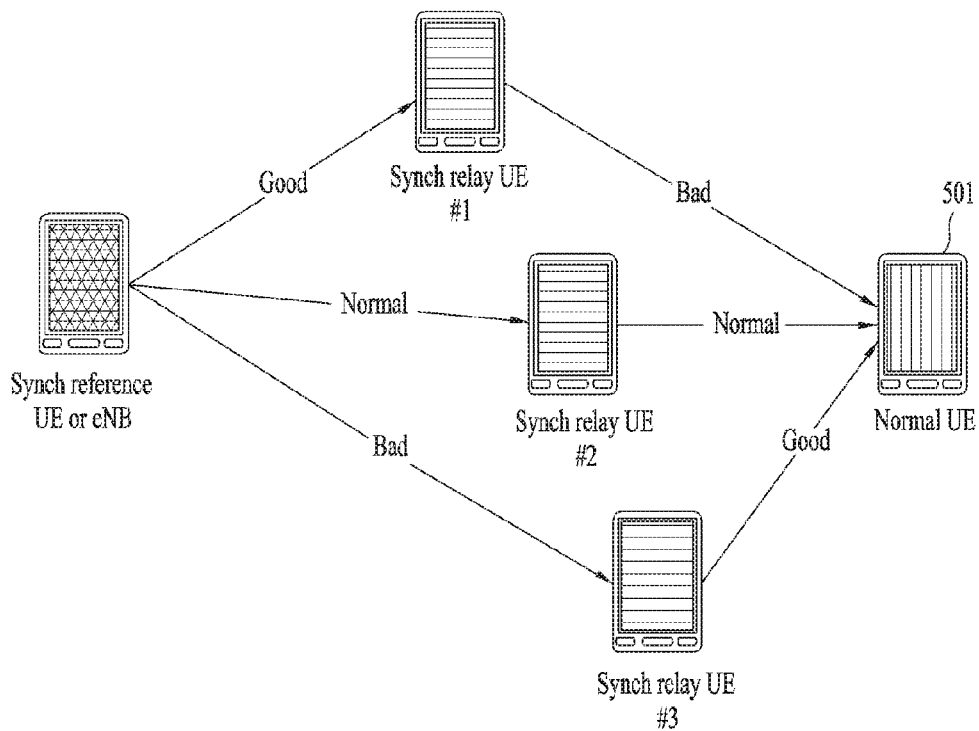
FIGS. 5 to 7 are diagrams to explain synchronization signal selection according to embodiments of the present invention.

The SRN may be a node for transmitting PD2DSCH, which may include information on the D2DSS and the SRN. The D2DSS may be implemented in the form of a specific sequence and the PD2DSCH may have the form of a sequence representing specific information or the form of a codeword obtained through predetermined channel coding. Herein, the SRN may be an eNB or a specific D2D UE. For instance, when UEs match synchronization with an eNB, the SRN is the eNB and the D2DSS is the PSS/SSS. In the case of 'partial network coverage' or 'out of network coverage', a UE may be the SRN. In the case of 'inter-cell discovery', a UE may relay the D2DSS at a time obtained by adding prescribed offset to a timing at which UEs receive the D2DSS from the SRN in order to inform UEs in a neighboring cell of the timing. That is, the D2DSS may be relayed across multiple hops. If the D2DSS is relayed by a plurality of UEs or there are a plurality of clusters in the vicinity, a UE that intends to receive the D2DSS may observe a plurality of D2DSSs and also receive D2DSSs with different hops. In this case, a hop count value may be included in D2DSS/PD2DSS to assist a D2D UE in selecting D2DSS, which will be used for synchronization acquisition. The UE can reduce errors by preferentially selecting a synchronization signal with a low hop count value since timing error may increase as the number of hops increases. Although such a scheme is advantageous in that an average signal quality can be expected since the hop count value and a signal quality of a current hop are considered, the scheme cannot reflect an actual synchronization (synch) quality according to UE topology. Moreover, it has a problem that a quality of D2DSS received at a previous hop is just determined based on only the hop count value. That is, in case that there are a plurality of D2DSSs with the same hop count value, if the quality of the previous hop is significantly low, selection of D2DSS with the highest reception quality in the current hop may not be appropriate selection. This will be described below with reference to FIG. 5. A UE 501, which intends to select a synchronization signal, may receive synchronization signals from synchronization (synch) relay node #1, #2, and #3. If the UE selects the synchronization signal with reference to a hop count value and signal/channel quality of a current hop (here, a hop between a synch relay node and a UE that selects a synchronization signal may be referred to as a current hop), the UE will select a synchronization signal with the highest signal quality in the current hop, i.e., the synchronization signal transmitted from the synch relay node #3 since all the synchronization signals have the same hop count value. However, as shown in the drawing, the synch relay node #3 has the lowest signal quality in a previous hop and thus the synchronization signal from the synch relay node #3 may be inappropriate for the UE 501 to perform synchronization acquisition. In other words, which synchronization relay or which synchronization signal transmitted from a synchronization relay is the best option cannot be determined based on only a hop count value and/or a signal quality of a current hop. Thus, a description will be given of methods for a UE to select an optimum synchronization signal to be used for synchronization acquisition when receiving synchronization signals from two or more nodes (e.g., synch relay nodes).

Selection of Synchronization Signal

When a UE receives synchronization signals containing hop count values from two or more nodes, the UE may select a synchronization signal to be used in synchronization acquisition. In this case, if the hop count values in the synchronization signals received from the two or more nodes are different from each other, the UE may select a synchronization signal with the lowest hop count value basically. On the contrary, if the hop count values are identical to each other, the UE may select the synchronization signal to be used in the synchronization acquisition by using information on a signal quality of a current hop and information on a signal quality of a previous hop.

Figure 6:
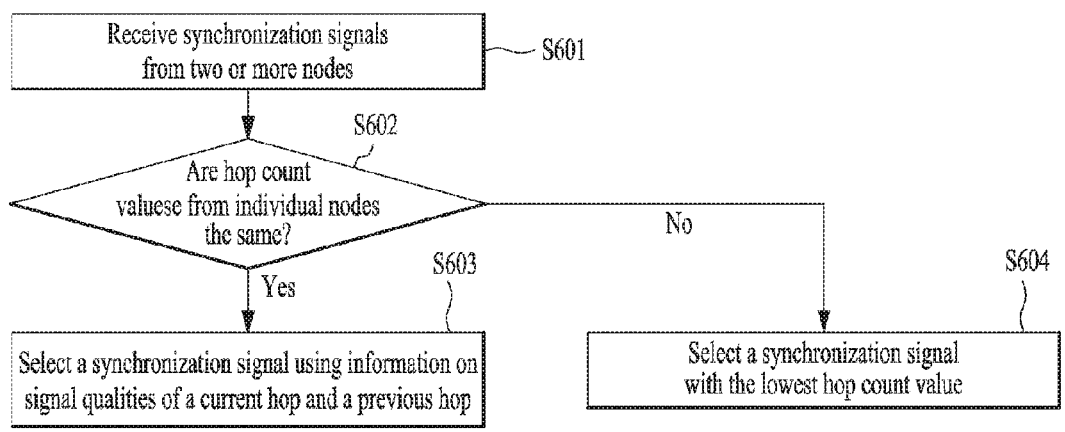

Referring to FIG. 6, to select a synchronization signal according to an embodiment of the present invention, a UE receives synchronization signals from two or more nodes [S601] and then compares hop count values contained in the synchronization signals transmitted from the two or more nodes to determine whether the hop count values are identical to each other [S602]. If the hop count values are the same, the UE selects a synchronization signal by using information on a signal quality of a current hop and a signal quality of a previous hop [S603]. If the hop count values are different from each other, the UE selects a synchronization signal with the lowest hop count value [S604]. Here, the previous hop may mean a hop (e.g., a hop between a synch reference UE and a synch relay UE) before one or more hops from the current hop. In addition, the signal quality information may correspond to a concept of including not only SINR, power strength of a received signal, and CQI but also a specific value capable of representing a signal quality. The signal quality information may be represented as accumulated power/accumulated SINR level after more than predetermined times of reception or it may be expressed as M-bit of a bitmap. In the following embodiments, first to third reference values may be identical to or different from each other. Moreover, a value defined as the first reference value in one embodiment may not necessarily be the same as that in another embodiment.

Embodiment 1

When the hop count values are the same, the synchronization signal with the lowest hop count value is selected. In this case, if the synchronization signal is transmitted through an extremely poor channel, the selected synchronization signal may not be appropriate in spite of the lowest hop count value. To prevent the above case, a channel state of the previous hop can be reflected in the hop count value. That is, if the signal reception quality of the previous hop is equal to or lower than a first threshold value, a penalty of +n may be imposed on the hop count value. In other words, if the signal quality of the current hop is equal to or lower than the first reference value with reference to a node determining the hop count value, the hop count value may be increased by greater than a value that is increased when the signal quality of the current hop is higher than a preset value with reference to the node determining the hop count value. For instance, when the signal quality of the current hop is greater than the first reference value, the hop count value may be configured to be increased by 1. When the signal quality of the current hop is equal to or lower than the first reference value, the hop count value may be configured to be increased by 2.

In addition, if the signal quality of the current hop is equal to or lower than the second reference value, a synch relay node may stop synchronization signal transmission. If the above two configurations are combined, the node determining the hop count value may perform the following operations by using the two reference value. When the reception quality is higher than the first reference value, the node may not apply the penalty to the hop count value. When the reception quality is equal to or lower than the first reference value and higher than the second reference value, the node may impose the penalty (the hop count value may be increased as described above or the penalty may be indicated through a penalty bit). When the reception quality is lower than the second quality, the node may not transmit D2DSS. According to the above method, a synchronization relay having a poor channel state increases a hop count value intentionally and then transmits a synchronization signal containing the hop count value to a UE. Thus, the synchronization relay can induce the UE to select a different synchronization source instead of itself (i.e. the synch relay having the poor channel state).

As another example of implementing the embodiment, 1 bit for indicating a hop quality can be added. When the quality is equal to or lower than a prescribed threshold, the bit may be set to 1. And, when the quality is equal to or higher than the prescribed threshold, the bit may be set to 0 (or vice versa). Thus, after receiving the bit, a UE may select D2DSS. If the threshold value is expressed as N steps, the D2DSS reception quality may be represented by a plurality of bits.

Hereinafter, a description will be given of a method of selecting a synchronization signal in case that hop count values are the same. The following embodiments can be implemented independently or together with the aforementioned embodiment 1. For instance, hop count values compared by a UE in the following embodiments 2 to 4 may be determined by applying the embodiment 1 is applied or without applying the embodiment 1.

Embodiment 2

The synchronization signal may include information on a signal reception quality of a hop before one hop from the current hop. When transmitting D2DSS, a UE may include a signal reception quality of $(n-1)^{th}$ D2DSS in the D2DSS. According to the above method, not only the signal quality of the current hop but also the signal quality of the previous hop are transmitted through the synchronization signal. Therefore, the method can assist the UE receiving the synchronization signal in selecting a synchronization source.

Figure 7:
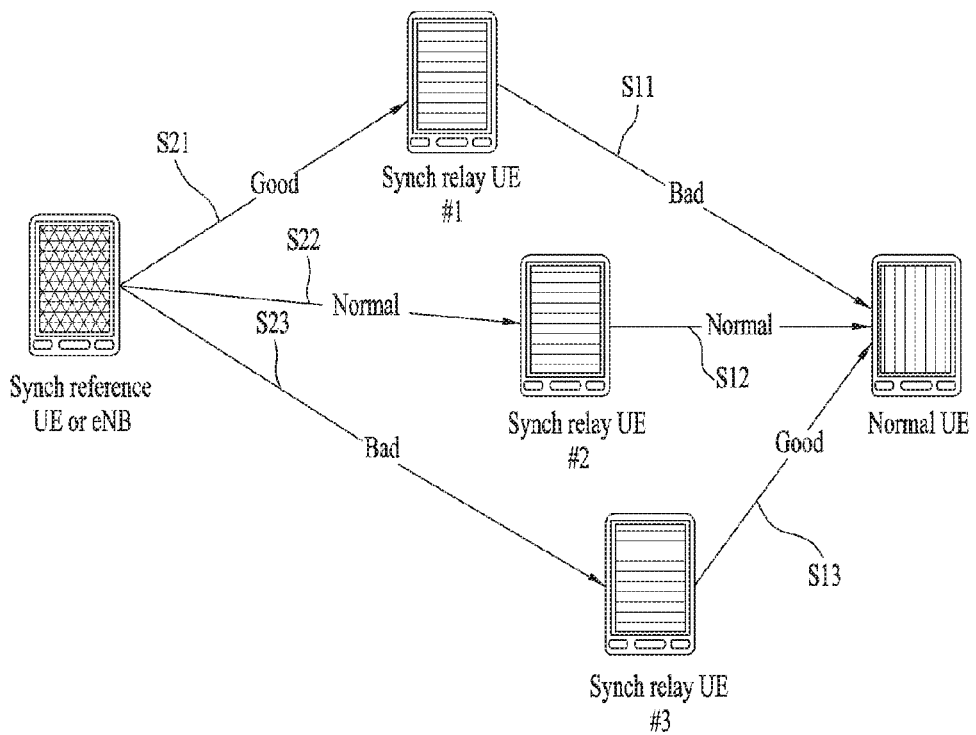

After receiving the information on the signal reception quality of the hop before one hop from the current hop, the UE may select a synchronization signal to be used in obtaining synchronization in consideration of the (measured) reception quality of the current hop, the signal reception quality of the previous hop, etc. Particularly, the UE may use a synchronization signal randomly selected (or a synchronization signal with the highest quality) from synchronization signals satisfying a condition that the signal quality of the current hop is equal to or higher than the first reference value and the signal quality of the hop before one hop from the current hop is equal to or higher than the second reference value to obtain the synchronization. For instance, it is assumed in FIG. 7 that a signal with the quality equal to or higher than the first reference value and a signal with the quality equal to or higher than the second reference value are represented as 'normal' and 'good', respectively. To obtain the synchronization, the UE may use a synchronization signal (s12) randomly selected from signals (s12 and s13) included in both of a case (s12 and s13) that the signal quality of the current hop exceeds the first reference value and a case (s22 and s23) that the signal quality of the hop before one hop from the current hop exceeds the second reference value.

As another scheme, the UE may use a synchronization signal randomly selected (or a synchronization signal with the highest quality) from synchronization signals satisfying a condition that a sum of the signal quality of the current hop and the signal quality of the hop before one hop from the current hop is equal to or higher than the third reference value to obtain the synchronization. In this case, the sum of the signal qualities may be a weighted sum and a weighting factor may be changed according to a hop count value.

Embodiment 3

The synchronization signal may include information on a reception quality accumulated to a hop before the current hop. That is, a reception quality for synchronization is accumulated every hop and then the information on the accumulated reception quality is transmitted by being included in PD2DSCH. For instance, on the premise that the reception quality is set to 10 in the case of the highest reception quality and the reception quality is set to 1 in the case of the lowest reception quality, if reference SINR is not satisfied per hop, the reception quality is evaluated by accumulating as much as—a (alternatively, on the premise that the reception quality is set to 10 in the case of the lowest reception quality and the reception quality is set to 1 in the case of the highest reception quality, if reference SINR is not satisfied per hop, the reception quality is evaluated by accumulating as much as +a). Thereafter, the accumulated reception quality is transmitted together with the synchronization signal. After receiving the accumulated reception quality, a UE may expect a synchronization quality accumulated to the previous hop and then utilize the accumulated synchronization quality for D2DSS selection.

As a particular example of the accumulated reception quality, the UE may use a synchronization signal randomly selected (or a synchronization signal with the highest quality) from synchronization signals satisfying a condition that the signal quality of the current hop is equal to or higher than the first reference value and the accumulated reception quality is equal to or higher than the second reference value to obtain the synchronization. Alternatively, the UE may use the synchronization signal randomly selected (or a synchronization signal with the highest quality) from synchronization signals satisfying a condition that a sum of the signal quality of the current hop and the accumulated reception quality is equal to or higher than the third reference value to obtain the synchronization. In this case, the sum of the signal qualities may be a weighted sum and a weighting factor may be changed according to a hop count value.

The above scheme may be interpreted as that when a signal quality is low, a hop count value that is intentionally set greater than an original hop count value is transmitted by imposing a prescribed penalty. As another example, the hop count value is transmitted together with the synchronization signal quality accumulated to the previous hop and thus it can assist a UE that receives both of the hop count and the accumulated synchronization signal quality in selecting a synchronization source.

Embodiment 4

The synchronization signal may include information on a signal quality of each of all the hops before the current hop. That is, not only the quality of the previous hop but also D2DSS reception quality of each hop can be transmitted individually. For instance, a UE transmitting D2DSS of an $n^{th}$ hop may transmit a signal quality of each of the hops from a first hop to an $(n-1)^{th}$ hop by including it in PD2DSCH. According to this scheme, the UE can estimate the signal quality of the $(n-1)^{th}$ hop but should determine the qualities of the hops before the $(n-1)^{th}$ hop by decoding PD2DSCH of the previous hop. This scheme is advantageous in that overall UE topology can be estimated based on the synchronization quality of each hop.

In particular, the UE may use a synchronization signal randomly selected (or a synchronization signal with the highest quality) from synchronization signals satisfying a condition that the signal quality of the current hop is equal to or higher than the first reference value and the signal quality of each of all the hops before the current hop is equal to or higher than the second reference value to obtain the synchronization. Alternatively, the UE may use a synchronization signal randomly selected (or a synchronization signal with the highest quality) from synchronization signals satisfying a condition that a sum of the signal quality of the current hop and a reception quality of an $i^{th}$ hop is equal to or higher than the third reference value to obtain the synchronization. In this case, the sum of the signal qualities may be a weighted sum and a weighting factor may be changed according to a hop count value.

In the above description, the hop count value and the information on the signal quality of the previous hop may be transmitted through PD2DSCH (physical D2D synchronization channel).

The aforementioned embodiments can be used independently or any combination thereof. For instance, a UE may select a synchronization signal using a combination of the embodiment 1 and the embodiment 2 or a combination of the embodiment 1 and the embodiment 3. Moreover, the above description is not necessarily limited to the synchronization signal. For example, when a certain type of specific communication signals are transmitted by a plurality of nodes, a UE can select one communication signal to be used by itself to obtain information through the aforementioned scheme.

Device Configuration According to Embodiments of the Present Invention

Figure 8:
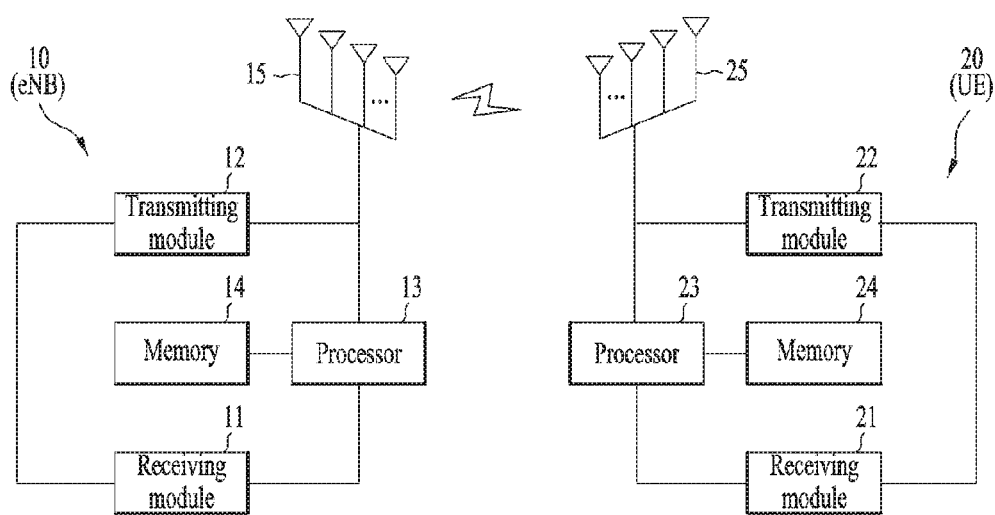
FIG. 8 is a block diagram illustrating configurations of transmitting and receiving devices.

FIG. 8 is a diagram illustrating configurations of a transmission point device and a user equipment device according to embodiments of the present invention.

Referring to FIG. 8, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 8, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 8 may be equally applied to a relay node device as a downlink transmission entity or an uplink reception entity. And, the description of the user equipment device 20 in FIG. 8 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of obtaining D2D (device-to-device) synchronization by a user equipment in a wireless communication system, the method comprising:
   receiving synchronization signals containing hop count values from two or more nodes; and
   selecting a synchronization signal to be used to obtain synchronization from the synchronization signals,
   wherein if the hop count values are different from each other, a synchronization signal with a lowest hop count value is selected as the synchronization signal to be used to obtain the synchronization, and
   wherein if the hop count values are identical to each other, the synchronization signal to be used to obtain the synchronization is selected by using information on a signal quality of a current hop and information on a signal quality of a previous hop before the current hop.

2. The method of claim 1, wherein if the signal quality of the current hop is equal to or lower than a first reference value with reference to a node determining the hop count value, the hop count value is increased by greater than a value increased when the signal quality of the current hop is higher than a preset value with reference to the node determining the hop count value.

3. The method of claim 2, wherein if the signal quality of the current hop is equal to or lower than a second reference value with reference to the node determining the hop count value, the node determining the hop count value stops transmission of the synchronization signal.

4. The method of claim 1, wherein the synchronization signal comprises information on a signal reception quality of a hop before one hop from the current hop.

5. The method of claim 4, wherein the user equipment uses a synchronization signal randomly selected from synchronization signals satisfying a condition that the signal quality of the current hop is equal to or higher than a first reference value and the signal quality of the hop before one hop from the current hop is equal to or higher than a second reference value to obtain the synchronization.

6. The method of claim 4, wherein the user equipment uses a synchronization signal satisfying a condition that a sum of the signal quality of the current hop and the signal quality of the hop before one hop from the current hop is equal to or higher than a third reference value to obtain the synchronization.

7. The method of claim 1, wherein the synchronization signal comprises information on a reception quality accumulated to a hop before the current hop.

8. The method of claim 7, wherein the user equipment uses a synchronization signal randomly selected from synchronization signals satisfying a condition that the signal quality of the current hop is equal to or higher than a first reference value and the accumulated reception quality is equal to or higher than a second reference value to obtain the synchronization.

9. The method of claim 7, wherein the user equipment uses a synchronization signal satisfying a condition that a sum of the signal quality of the current hop and the accumulated reception quality is equal to or higher than a third reference value to obtain the synchronization.

10. The method of claim 1, wherein the synchronization signal comprises information on a signal quality of each of all the hops before the current hop.

11. The method of claim 10, wherein the user equipment uses a synchronization signal randomly selected from synchronization signals satisfying a condition that the signal quality of the current hop is equal to or higher than a first reference value and the signal quality of each of all the hops before the current hop is equal to or higher than a second reference value to obtain the synchronization.

12. The method of claim 1, wherein the hop count value and the information on the signal quality of the previous hop are transmitted through a PD2DSS (physical D2D synchronization channel).

13. A D2D (device-to-device) user equipment for obtaining D2D synchronization in a wireless communication system, comprising:
a receiving module; and
a processor,
wherein the processor is configured to receive synchronization signals containing hop count values from two or more nodes and select a synchronization signal to be used to obtain synchronization from the synchronization signals,
wherein if the hop count values are different from each other, a synchronization signal with a lowest hop count value is selected as the synchronization signal to be used to obtain the synchronization and
wherein if the hop count values are identical to each other, the synchronization signal to be used to obtain the synchronization is selected by using information on a signal quality of a current hop and information on a signal quality of a previous hop before the current hop.

* * * * *